United States Patent
Saito (10) Patent No.: US 9,063,651 B2
(45) Date of Patent: Jun. 23, 2015

(54) DISPLAY DEVICE, CONTROL METHOD AND RECORDING MEDIUM

(75) Inventor: Mayuko Saito, Tokyo (JP)

(73) Assignee: Lenovo Innovations Limited, Quarry Bay (HK)

( * ) Notice: Subject to any disclaimer, the term of this patent is extended or adjusted under 35 U.S.C. 154(b) by 131 days.

(21) Appl. No.: 13/499,221

(22) PCT Filed: Sep. 29, 2010

(86) PCT No.: PCT/JP2010/066977
§ 371 (c)(1),
(2), (4) Date: Mar. 29, 2012

(87) PCT Pub. No.: WO2011/040483
PCT Pub. Date: Apr. 7, 2011

(65) Prior Publication Data
US 2012/0188193 A1    Jul. 26, 2012

(30) Foreign Application Priority Data
Sep. 29, 2009    (JP) .................................. 2009-223583

(51) Int. Cl.
    *G06F 3/041* (2006.01)
    *G06F 3/0488* (2013.01)
(52) U.S. Cl.
    CPC .. *G06F 3/04883* (2013.01); *G06F 2203/04104* (2013.01); *G06F 2203/04808* (2013.01); *G06F 3/04886* (2013.01)
(58) Field of Classification Search
    CPC ................ G06F 3/041; G06F 3/04886; G06F 2203/04104; G06F 2203/04808; G06F 3/0488; G06F 3/04883; G06F 3/044; G06F 3/045

USPC ......................................................... 345/173
See application file for complete search history.

(56) References Cited

U.S. PATENT DOCUMENTS

| | | | |
|---|---|---|---|
| 7,969,412 B2 * | 6/2011 | Nagiyama et al. | 345/173 |
| 8,212,782 B2 | 7/2012 | Cho | |
| 2006/0097991 A1 * | 5/2006 | Hotelling et al. | 345/173 |

(Continued)

FOREIGN PATENT DOCUMENTS

| CN | 101042300 | 9/2007 |
|---|---|---|
| CN | 101131620 A | 2/2008 |

(Continued)

OTHER PUBLICATIONS

International Search Report, PCT/JP2010/066977, Nov. 16, 2010.

(Continued)

*Primary Examiner* — Towfiq Elahi (57) ABSTRACT

A touch panel (2) displays an image. A position detection unit (3) detects the XY coordinates of each of two touched positions on the touch panel (2). When the position detection unit (3) detects twice XY coordinates of two touched positions, a calculation unit (4) computes variation amounts of each of the X-direction distances and the Y-direction distances between the two touched positions between the detection of the former coordinates and the detection of the latter coordinates. A control execution unit (5) controls a first controlled object according to the variation amount of the X-direction distances that have been computed by the calculation unit (4), and controls a second controlled object according to the variation amount of the Y-direction distances that have been computed by the calculation unit (4).

13 Claims, 7 Drawing Sheets

(56) References Cited

U.S. PATENT DOCUMENTS

| | | |
|---|---|---|
| 2007/0152984 A1 | 7/2007 | Ording et al. |
| 2008/0048990 A1 | 2/2008 | Cho et al. |
| 2008/0165141 A1* | 7/2008 | Christie .................. 345/173 |
| 2010/0245263 A1* | 9/2010 | Parada et al. ............. 345/173 |

FOREIGN PATENT DOCUMENTS

| | | |
|---|---|---|
| JP | 07-230352 | 8/1995 |
| JP | 2006-162267 | 6/2006 |
| JP | 2006-277588 | 10/2006 |
| JP | 3867226 | 10/2006 |
| JP | 2007-240964 | 9/2007 |
| JP | 2008-052729 | 3/2008 |
| JP | 2008-217767 | 9/2008 |
| JP | 2009-522669 | 6/2009 |
| JP | 2009-187057 | 8/2009 |
| JP | 2010-55598 | 3/2010 |

OTHER PUBLICATIONS

Japanese Official Action—2011-534281—Jun. 10, 2014.
Chinese Office Action dated Feb. 27, 2014; Publication No. 201080043809.2.
Chinese Office Action, dated Sep. 26, 2014, in corresponding Chinese Patent Application No. 201080043809.2.

* cited by examiner

DISPLAY DEVICE, CONTROL METHOD AND RECORDING MEDIUM

TECHNICAL FIELD

The present invention relates to a display device, a control method and a recording medium.

BACKGROUND ART

Various types of terminals equipped with display devices having touch panels are known. For example, Patent Documents 1-3 describe display devices that can be operated not just by one of the user's fingers but by the touch of two or more fingers (multi-touch).

Patent Document 1 describes a touch panel system that enlarges or reduces (scales) display information on a screen such as still images or Web pages or the like through the operation of moving two fingers apart or closer together.

Patent Document 2 describes a system in which a map displayed on a panel screen of a display device can be enlarged or shrunk by an operation with two fingers and in addition cabin temperature can be adjusted on a car air conditioner through an operation by three fingers.

Patent Document 3 describes a display device in which two display units equipped with touch panels are positioned adjacent to each other, wherein the display device calculates the movement distances of the positions of a first finger on the first touch panel and a second finger on the second touch panel, and if there is a difference of at least a defined value in the movement distances, enlarges or reduces image data displayed on the display unit in accordance with the change in distances.

PRIOR ART LITERATURE

Patent Documents

Patent Document 1: Japan Patent No. 3867226
Patent Document 2: Unexamined Japanese Patent Application Kokai Publication No. 2006-162267
Patent Document 3: Unexamined Japanese Patent Application Kokai Publication No. 2007-240964

DISCLOSURE OF INVENTION

Problems to be Solved by the Invention

In the art described in Patent Documents 1-3, the device executes a single process in response to a single operation by a finger. Consequently, when the device is caused to execute multiple processes, multiple operations are necessary, causing operation to become complex.

In consideration of the foregoing, it is an object of the present invention to provide a display device that can execute multiple processes in response to simple operations by fingers or the like, a control method and a recording medium on which a program for realizing such on a computer is recorded.

In addition, it is another object of the present invention to provide a display device capable of input from multiple fingers through simple operations, a control method and a recording medium for realizing such on a computer.

Means for Solving the Problems

In order to achieve the above object, the display device according to a first aspect of the present invention comprises:

a touch panel for displaying images;
a position detection unit for detecting XY coordinates of two touched positions on the touch panel;
a computation unit that, when the XY coordinates of the two touched positions have been detected twice, computes differentials of X-direction distances and of Y-direction distances of the two touched positions from a former coordinate detection to a latter coordinate detection; and
a control execution unit for controlling a first control subject in accordance with the differential of the X-direction distances computed by the computation unit, and controlling a second control subject in accordance with the differential of the Y-direction distances computed by the computation unit.

In order to achieve the above object, the control method according to a second aspect of the present invention comprises:

a step for detecting XY coordinates of two touched positions on a touch panel;
a step for computing, when the XY coordinates of the two touched positions are detected twice within a predetermined time, the differentials of the X-direction distances and the Y-direction distances between the two touched positions from the former coordinate detection to the latter coordinate detection; and
a step for executing control of a first control subject in accordance with the computed differential of the X-direction distances, and executing control of a second control subject in accordance with the computed differential of the Y-direction distances.

In order to achieve the above object, the computer-readable recording medium according to a third aspect of the present invention records a program that causes a computer in a display device with a touch panel for displaying images to execute:

a step for detecting the XY coordinates of two touched positions on a touch panel;
a step for computing, when the XY coordinates of the two touched positions are detected twice within a predetermined time, the differentials of the X-direction distances and the Y-direction distances of the two touched positions from a former coordinate detection to a latter coordinate detection; and
a step for executing control of a first control subject in accordance with the computed differential of the X-direction distances, and executing control of a second control subject in accordance with the computed differential of the Y-direction distances.

Efficacy of the Invention

The display device of the present invention can execute multiple processes in response to simple operations by fingers or the like.

BRIEF DESCRIPTION OF DRAWINGS

FIG. 1B is a block diagram showing the composition of a position detection unit and the like.
FIGS. 4A-1, 4A-2, 4B-1 and 4B-2 are drawings showing control when two fingers are moved farther apart or brought closer together in the X direction.

FIGS. 5A-1, 5A-2, 5B-1 and 5B-2 are drawings showing control when two fingers are moved farther apart or brought closer together in the Y direction.

BEST MODE FOR CARRYING OUT THE INVENTION

Hereinafter, a display device 1 according to an embodiment of the present invention is described with reference to the drawings.

Figure 1A:
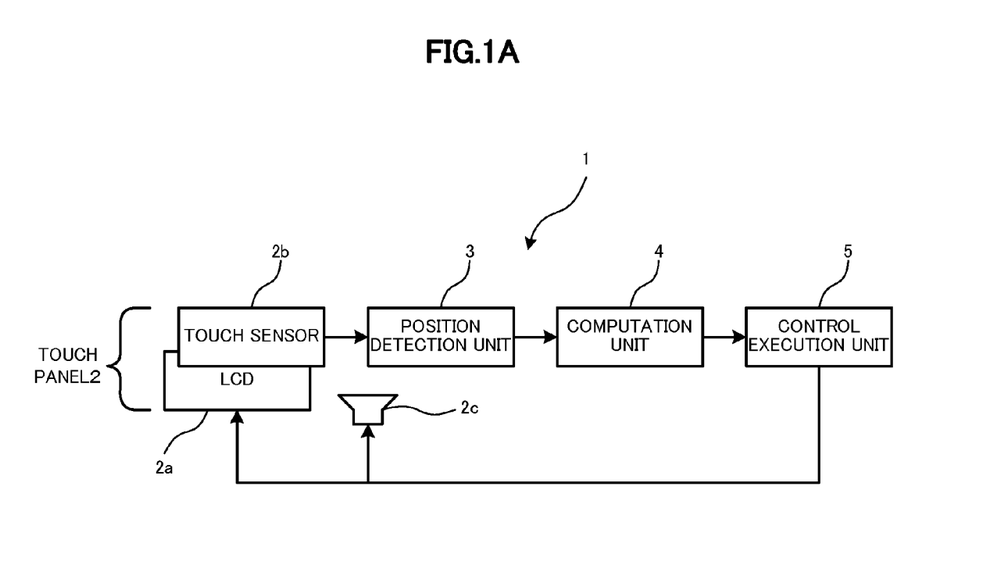
FIG. 1A is a block diagram showing the composition of a display device according to an embodiment of the present invention.

The display device 1 according to the present invention is provided with a touch panel 2, a position detection unit 3, a computation unit 4 and a control execution unit 5, as shown in FIG. 1A.

The touch panel 2 is composed of an LCD (liquid crystal display) 2a, a capacitive touch sensor 2b positioned on the LCD 2a, and a speaker 2c. The LCD 2a displays an image on the screen, and the touch sensor 2b supplies to the position detection unit 3 electrical voltage signals in accordance with the positions touched by the user's fingers (touched position). The speaker 2c outputs sounds.

The position detection unit 3 detects the XY coordinates of the positions on the touch panel 2 touched by the user's fingers, on the basis of the electrical voltage signals supplied from the touch sensor 2b.

When the position detection unit 3 detects the XY coordinates of two touched positions twice in succession, the computation unit 4 computes the differentials of the X-direction distance and the Y-direction distance on the former two touched positions and the X-direction distance and the Y-direction distance on the latter two touched positions.

The control execution unit 5 executes control on a first control subject in accordance with the differential of the X-direction distances computed by the computation unit, and executes control on a second control subject in accordance with the differential of the Y-direction distances computed by the computation unit 4.

Figure 1B:
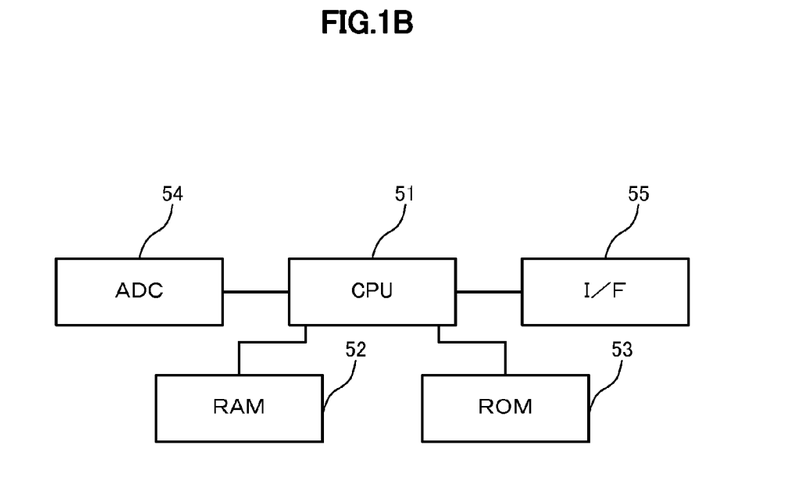

The position detection unit 3, the computation unit 4 and the control execution unit 5 are composed of a CPU (central processing unit) 51, a RAM (random access memory) 52, a ROM (read-only memory) 53, an ADC (analog to digital converter) 54, an I/F (interface) 55 and the like, as shown in FIG. 1B. The position detection unit 3, the computation unit 4 and the control execution unit 5 are realized by the CPU 51 executing a program stored in the ROM 53, which is one example of a recording medium.

The CPU 51 temporarily stores various types of data in the RAM 52. The ADC 54 converts the analog signal of voltage or the like supplied from the touch sensor 2b into a digital signal and supplies the output to the CPU 51. The I/F 55 is an interface for receiving and sending data between the CPU 51 and other hardware.

When two touched positions have been detected twice in succession on the touch panel 2, the display device 1 i) calculates the X-direction distance and the Y-direction distance between the two detected positions detected formerly, ii) calculates the X-direction distance and the Y-direction distance between the two detected positions detected later, iii) computes the differential of the X-direction distances and the differential of the Y-direction distances, and iv) controls the first control subject in accordance with the differential of the X-direction distances and controls the second control subject in accordance with the differential of the Y-direction distances. Accordingly, when the user continuously touches the touch panel 2 using two fingers, the display device 1 accomplishes separate controls in the X-direction and the Y-direction in accordance with the differential of the X-direction distance and the Y-direction distance accompanying the continuous touching. Through this, the user can cause multiple processes to be executed on the display device 1 through a simple operation with the fingers.

Hereinafter, a concrete example of the display device 1 that controls the display size of the image in accordance with the differential of the X-direction distances and controls the sound volume of the speaker 2c in accordance with the differential of Y-direction distances is described with reference to FIGS. 2-5.

Figure 2:
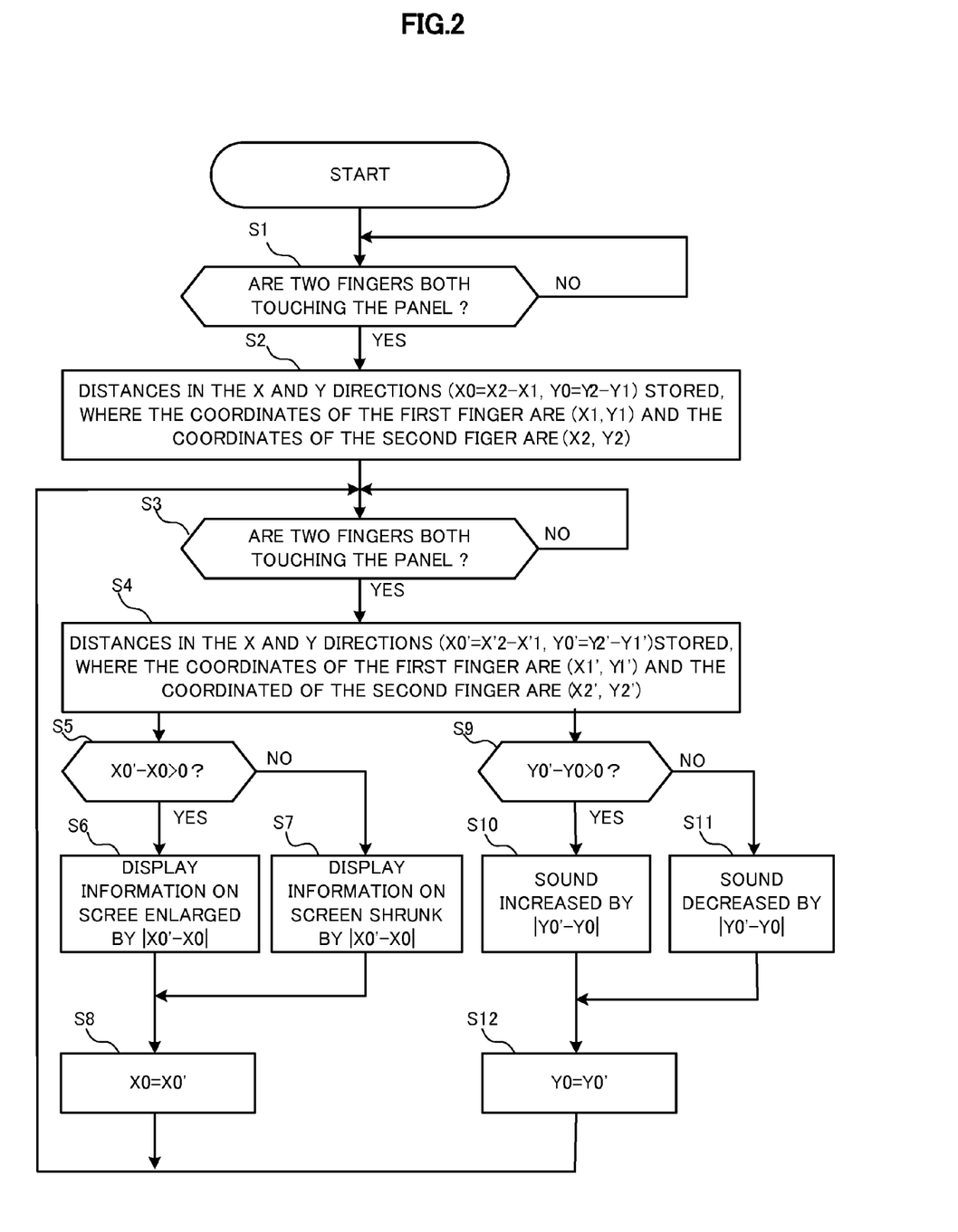
FIG. 2 is a flowchart showing the operation of a display device according to an embodiment of the present invention.
Figure 04A:
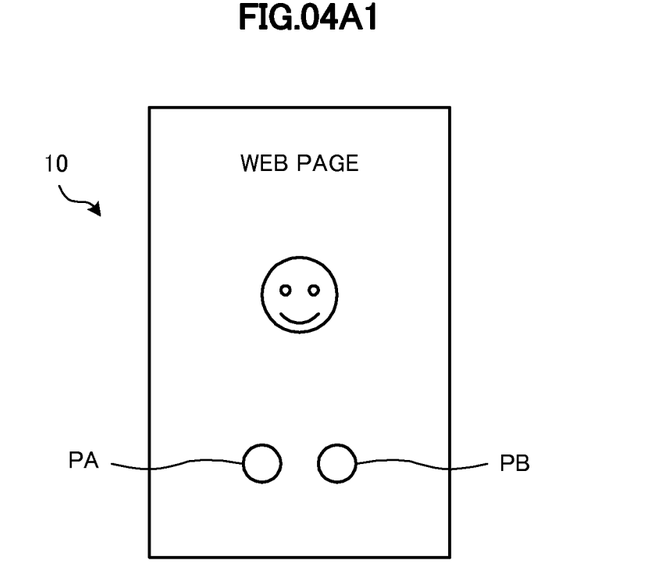
Figure 04A:
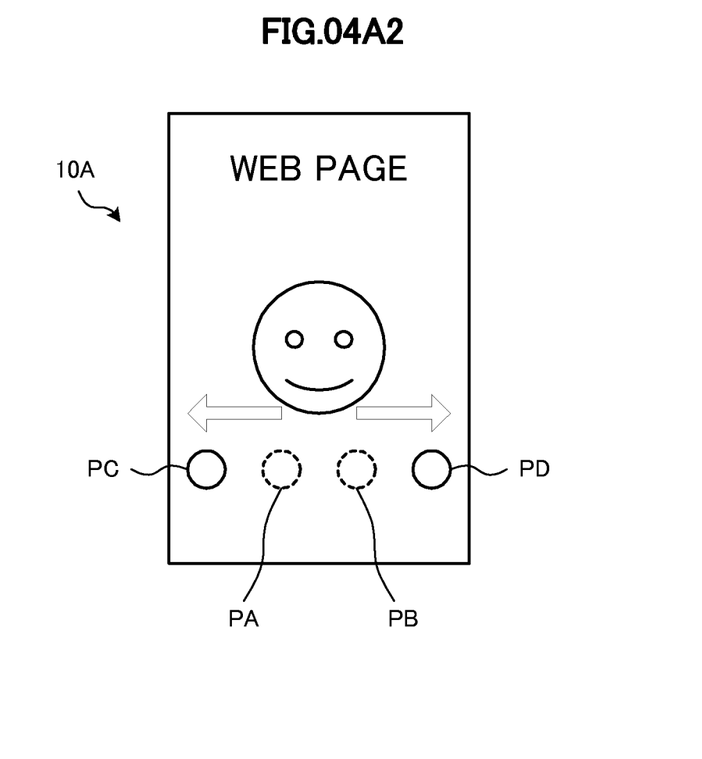
Figure 04B:
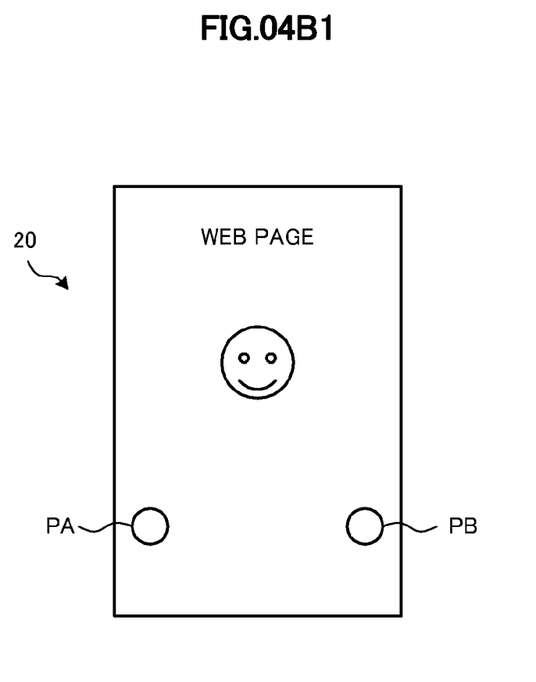
Figure 04B:
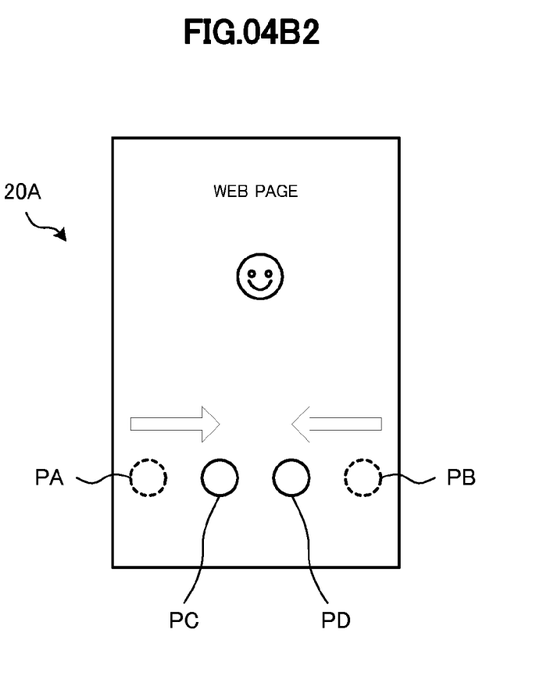

The display device 1 according to the present embodiment starts the process shown in FIG. 2 after the power is turned on. In order to facilitate understanding, the LCD 2a of the display device 1 is assumed to be displaying the Web page shown in FIG. 4A-1.

First, the position detection unit 3 of the display device 1 determines whether or not two of the user's fingers are concurrently touching the touch panel 2, on the basis of voltage signals supplied from the touch sensor 2b (step S1). The position detection unit 3 assumes a standby state until it is determined that two fingers are concurrently touching the touch panel 2 (step S1: No). When it is determined that two fingers are concurrently touching the touch panel 2 (step S1: Yes), the position detection unit 3 detects the respective XY coordinates of the two touched positions on the touch panel 2 touched by the two fingers.

Figure 03:
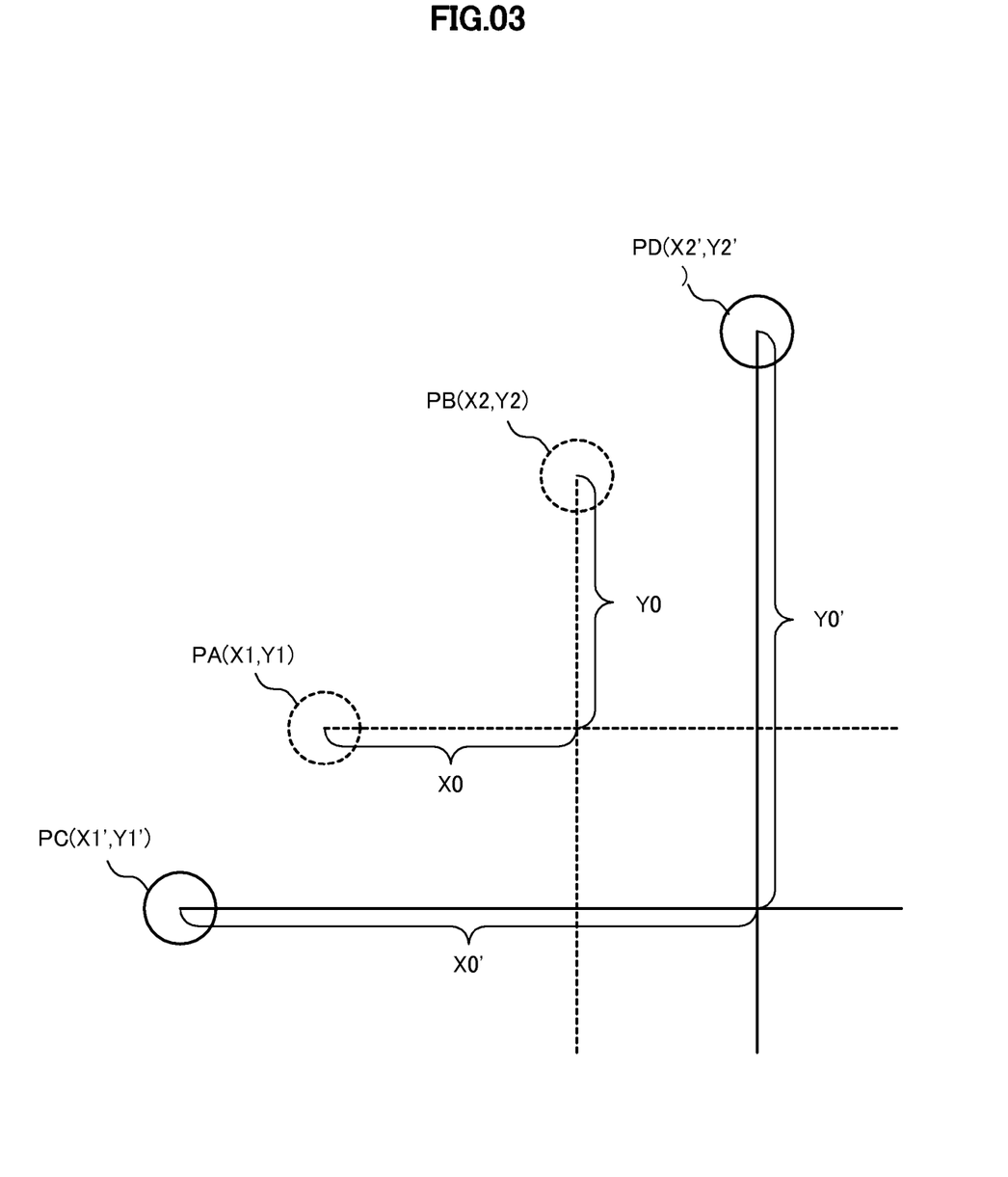
FIG. 3 is a drawing showing an image corresponding to steps S1 to S4 in FIG. 2.

For example, suppose that the user touches positions PA and PB shown in FIG. 3 on the touch panel 2. Here, the XY coordinates of position PA are (X1, Y1) and the XY coordinates of position PB are (X2, Y2), as shown in FIG. 3.

The computation unit 4 computes the distance X0 in the X-direction and the distance Y0 in the Y-direction between the positions PA and PB and stores the computation results (step S2). That is to say, the X-direction distance X0=X2−X1 and the Y-direction distance Y0=Y2−Y1 are found and stored.

Next, the position detection unit 3 again determines whether or not two of the user's fingers are concurrently touching the touch panel 2 (step S3). The position detection unit 3 assumes a standby state until it is determined that two fingers are concurrently touching the touch panel 2 (step S3: No), and when it is determined that two fingers are concurrently touching the touch panel 2 (step S3: Yes), the position detection unit 3 detects the respective XY coordinates of the two fingers on the touch panel 2.

Suppose that the user touches positions PC and PD on the touch panel 2. Here, the XY coordinates of position PC are (X1', Y1') and the XY coordinates of position PD are (X2', Y2').

The computation unit 4 computes the distance X0' in the X-direction and the distance Y0' in the Y-direction between the positions PC and PD and stores the distances X0' and Y0' found (step S4). That is to say, the computation unit 4 calculates the X-direction distance X0'=X2'−X1' and the Y-direction distance Y0'=Y2'−Y1', and stores the distances X0' and Y0' found.

Next, the computation unit 4 calculates the differential of the X-direction distances and controls enlarging or reducing of the display image on the LCD 2a, and calculates the differential of the Y-direction distances and controls the sound volume of the speaker 2c, on the basis of the X-direction distance X0 and the Y-direction distance Y0 between the touched positions PA and PB found in step S2, and the X-direction distance X0' and the Y-direction distance Y0' between the touched positions PC and PD obtained in step S4 (steps S5-S12).

First, the process of finding the differential of the X-direction distances (steps S5-S8) will be described in detail.

In step S5, the computation unit 4 determines whether or not the value X0'−X0 is larger than 0 in regard to the differential of the X-direction distances. In other words, the computation unit 4 in step S5 determines whether the differential of the X-direction distances is positive or negative.

When it is determined in step S5 that the differential of the X-direction distances is positive (step S5: Yes), the control execution unit 5 controls the first control subject in accordance with the value of the magnitude |X0'−X0| of the differential of the X-direction distances (step S6). In this example, the first control subject is the scale of the image displayed on the LCD 2a, so the control execution unit 5 executes control to enlarge the display image in accordance with the magnitude of the differential of the X-direction distances.

On the other hand, when it is determined in step S5 that the differential of the X-direction distances is negative (step S5: No), the control execution unit 5 executes control that is the reverse of the control in the above-described step S6 on the first control subject in accordance with the magnitude of the differential of the X-direction distances, that is to say |X0'−X0| (step S7). In other words, the control execution unit 5 accomplishes control to reduce the display image in accordance with the magnitude of the differential of the X-direction distances.

After the above-described steps S6 and S7, the computation unit 4 replaces the X0 stored in memory with X0' (step S8). Next, control by the position detection unit 3 returns again to the above-described step S3 and the position detection unit 3 assumes a standby state in preparation for the next (third) touching of the touch panel 2 by two of the user's fingers.

The above process will be described in detail with reference to FIGS. 4A-1 to 4B-2.

For example, suppose display information 10 is displayed on the touch panel 2 in regular size (1×), as shown in FIG. 4A-1. The display information 10 is, for example, an image on a Web page. The frame in the drawing corresponds to the outer frame of the touch panel 2. The user touches the position PA with one finger, touches the position PB with another finger, and then, as shown in FIG. 4A-2, touches the position PC with one finger and touches the position PD with another finger. In this case, the user performs the operation of spreading the two fingers in the X-direction while perusing the Web page. Accompanying this operation, the control execution unit 5 enlarges the display information 10 to create the display information 10A, as shown in FIG. 4A-2, and causes the display information 10A to be displayed on the LCD 2a.

In addition, suppose display information 20 is displayed on the touch panel 2 in normal size (1×), for example as shown in FIG. 4B-1. Now suppose that the user touches the position PA with one finger and touches the position PB with another finger, then later, as shown in FIG. 4B-2, touches the position PC with one finger and touches the position PD with another finger. In this case, the user has performed an operation bringing the two fingers closer together in the X-direction while perusing the Web page. Accompanying this operation, the control execution unit 5 reduces the display information 20 and causes the shrunken display information 20A to be displayed on the LCD 2a.

The user may appropriately set the enlargement or reduction ratios of the display information 10 and 20 in these steps S6 and S7 for each application displaying this display information 10 and 20. As one example, in the case of a mailer, if the magnitude of the differential of the X-direction distances is larger than a predetermined value, the control execution unit 5 may raise or lower the text magnification ratio by one level. In addition, in the case of an application displaying images, if the magnitude of the differential of the X-direction distances is larger than a predetermined value, the control execution unit 5 may increase or decrease the magnification ratio of the image by 10%.

Next, the processes related to the differential of the Y-direction distances (steps S9-S12) will be described. In step S9, the computation unit 4 determines whether or not the value Y0'−Y0 is larger than 0 in regard to the differential of the Y-direction distances. In other words, the computation unit 4 in step S9 determines whether the differential of the Y-direction distances is positive or negative.

When it is determined in step S9 that the differential of the Y-direction distances is positive (step S9: Yes), the control execution unit 5 controls the second control subject in accordance with the magnitude |Y0'−Y0| of the differential of the Y-direction distances (step S10). As a second control subject, for example the sound volume of music or video on a Web page can be cited. Here, the control execution unit 5 executes control to raise the sound volume, which is the second control subject, in accordance with the magnitude of the differential of the Y-direction distances.

On the other hand, when it is determined in step S9 that the differential of the Y-direction distances is negative (step S9: No), the control execution unit 5 executes control that is the reverse of the control in the above-described step S10 on the second control subject in accordance with the magnitude of the differential of the Y-direction distances, that is to say |Y0'−Y0| (step S11). In other words, the control execution unit 5 accomplishes control to lower the sound volume which is the second control subject, in accordance with the magnitude of the differential of the Y-direction distances.

After the above-described steps S10 and S11, the computation unit 4 replaces the Y0 stored in memory with Y0' (step S12). Next, control by the position detection unit 3 returns again to the above-described step S3. Upon returning to step S3, the position detection unit 3 assumes a standby state until it is determined that two of the user's fingers are concurrently touching the touch panel, and when it is determined that two of the user's fingers are concurrently touching the touch panel, the processes from above-described step S4 are repeated.

Figure 05A:
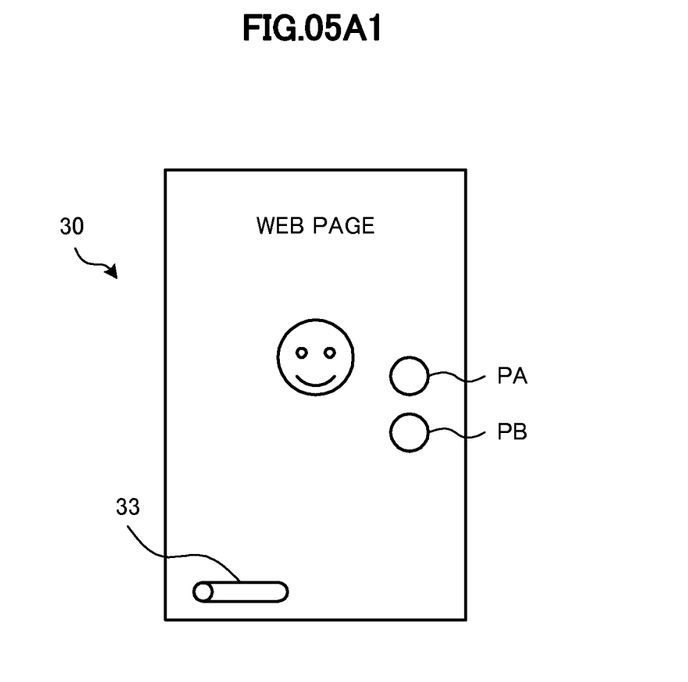
Figure 05A:
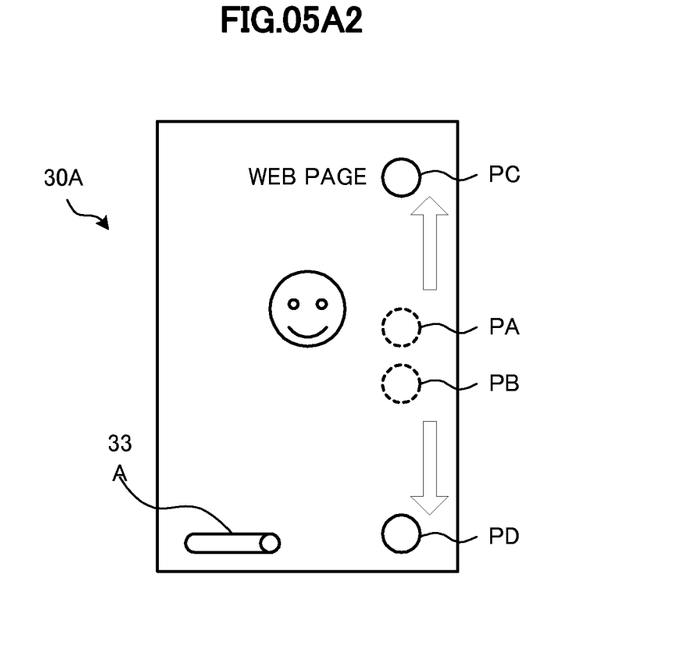
Figure 05B:
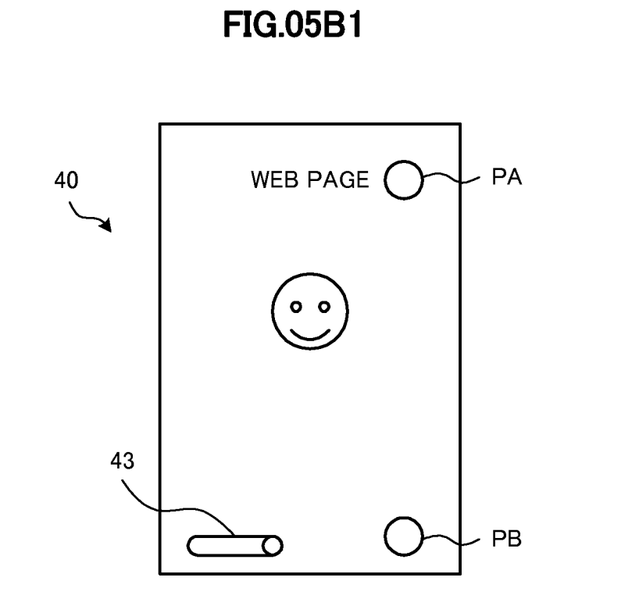
Figure 05B:
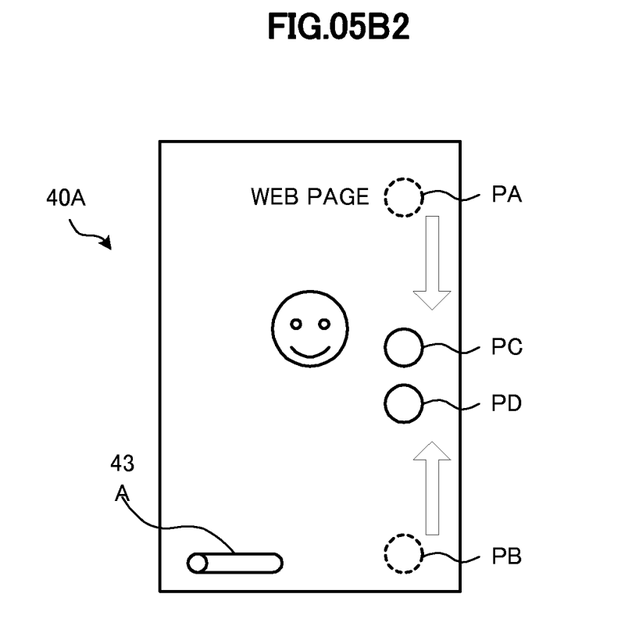

Step S10 will be described in detail with reference to FIGS. 5A-1 and 5A-2. As shown in FIG. 5A-1, display information 30 including a volume display bar 33 is displayed. For example, suppose the slider of the volume display bar 33 is at the left end, indicating that volume is low. Suppose the user touches one finger at position PA and another finger at position PB, and as shown in FIG. 5A-2, touches one finger at position PC and another finger at position PD. In this case, the user has performed an operation to make the two fingers wider apart in the Y-direction on the touch panel 2. Accompanying this operation, the control execution unit 5 controls an unrepresented volume control unit and raises the volume of the speaker 2c. Furthermore, the control execution unit 5 displays the display information 30A including the volume display bar 33A on the touch panel 2. At this time, the control execution unit 5 indicates that volume has been increased by moving the slider of the volume display bar 33A to the right side.

Step S11 will be described in detail with reference to FIGS. 5B-1 and 5B-2. As shown in FIG. 5B-1, display information 40 including a volume display bar 43 is displayed. For example, suppose the slider of the volume display bar 43 is at the right end, indicating that volume is high. Suppose the user touches one finger at the position PA and another finger at the position PB, and as shown in FIG. 5B-2, touches one finger at the position PC and another finger at the position PD. In this case, the user has performed an operation to make the two fingers closer together in the Y-direction on the touch panel 2. Accompanying this operation, the control execution unit 5 controls an unrepresented volume control unit and lowers the volume of the speaker 2c. Furthermore, the control execution unit 5 displays the display information 40A including the volume display bar 43A on the touch panel 2. At this time, the control execution unit 5 indicates that volume has been decreased by moving the slider of the volume display bar 43A to the left side.

The user may appropriately set the sound volume in these steps S10 and S11 for each application accompanying the sound output. As one example, when an application that replays music is executed, if the magnitude |Y0'−Y0| of the differential of the Y-direction distances is larger than a predetermined value, the control execution unit 5 may increase or decrease the volume by only one level or 10%.

In this embodiment, the differential of the X-direction distances and the differential of the Y-direction distances are computed, enlarging or reducing (scaling) of display information is accomplished in accordance with the magnitude of the differential of the X-direction distances and whether this differential is positive or negative, and in addition, the sound volume is raised or lowered in accordance with the magnitude of the differential of the Y-direction distances and whether this differential is positive or negative. That is to say, a scaling control can be accomplished through operation in only the X-direction and a sound control can be accomplished through operation in only the Y-direction. Accordingly, it is possible to accomplish independent control in the X-direction and the Y-direction, and for example, it is possible assign mutually differing various controls, such as scaling control and sound volume control, to each direction, so that with a simple operation with the fingers, two processes can be executed on the display device 1.

In the above-described embodiment, control was executed to enlarge or reduce normal-size display information while preserving the ratio in the XY directions through an operation of bringing two fingers farther apart or closer together, as shown in FIGS. 4A-1 to 4B-2, but this is intended to be illustrative and not limiting. As one example, control may be assigned to the XY directions, respectively, on the touch panel 2 such that when an operation is performed bringing two fingers farther apart or closer together in the X direction, only the X-direction of the display information is enlarged or reduced, and in addition, when an operation is performed bringing two fingers farther apart or closer together in the Y direction, only the Y-direction of the display information is enlarged or reduced. Through this, it is possible to accomplish enlargement or reduction that differentials the ratio in the XY directions, unlike simple enlargement or reduction that preserves the ratio of the display information in the XY direction.

In addition, in above-described steps S6 and S7, control (enlargement or reduction) of the first control subject (display information) is executed in accordance with the magnitude of the differential of the X-direction distances, and in addition, in above-described steps S10 and S11, control (raising or lowering) of the second control subject (sound volume) is executed in accordance with the magnitude of the differential of the Y-direction distances, but this is intended to be illustrative and not limiting. As an example, a selection unit for selecting the first and second control subjects from among a multitude of control subjects may appropriately assign control subjects to the XY directions so that control of the second control subject is executed in accordance with the magnitude of differential of the X-direction distances and control of the first control subject is executed in accordance with the magnitude of differential of the Y-direction distances. Here, the selection unit may be composed of the CPU 51, the RAM 52, the ROM 53, the ADC 54, the I/F 55 or the like, as shown in FIG. 1B, and the above-described process can be executed by the CPU executing a program stored in memory.

In addition, in FIG. 5, a volume display bar 33, 33A, 43 or 43A was displayed on the touch panel in consideration of ease-of-use by the user, but sound volume can be confirmed by hearing, so the volume display bars 33, 33A, 43 and 43A need not be displayed.

Furthermore, in consideration of the user's ease of use, the settings may be such that if the differential of the X- and Y-direction distances is less than a predetermined value, control of the first and second control subject is not executed. Through this, it is possible to avoid situations in which unintentional control is executed by the fingers moving only slightly when two of the user's fingers are touching the touch panel 2.

When the touch panel 2 is displaying a display other than a Web page, that is to say a map, TV screen, touch panel selection screen or the like, the control subjects may be altered dependent on that screen display. For example, when a TV screen is displayed, enlarging or reducing the TV screen and raising or lowering sound volume may be assigned to the X- and Y-directions, respectively.

With the above-described embodiment, the display device 1 is such that some kind of control is accomplished when touching onto two places of the touch panel 2 occurs twice. However, when the time between the first touching and the second touching is longer than a predetermined time, the process may be cancelled and the process may be returned to step S1.

In this case, for example the control execution unit 5 may be provided with an internal timer, the internal timer may be activated when a determination of Yes is made in steps S1 and S3, and when a determination of No is made in the process of step S3, if the elapsed time on the internal timer is larger than or equal to a reference time, the process may be forcibly returned to step S1.

The above-described embodiment mainly explains an input process when two touched positions were detected, but obviously a normal input process by the touch panel may be executed simultaneously with this. In addition, after touching by two fingers is detected, the process may return to step S1 when a normal input process is detected.

In addition, in the above-described embodiment an capacitive model was illustrated as the touch sensor 2b, but the touch sensor 2b is not limited to an capacitive model, and may be a model corresponding to multi-touch.

In addition, an example was shown for detecting positions in two dimensions, but the movement of two fingers in three-dimensional space may be detected, the differential of distances in the X-axis direction, the Y-axis direction and the Z-axis direction may be detected, and a first control assigned to the differential in the X-axis direction, a second control assigned to the differential in the Y-axis direction and a third control assigned to the differential in the Z-axis direction.

As previously described, the present invention was described on the basis of a preferred embodiment thereof, but the display device of the present invention is not limited to the composition of the above-described embodiment, and various modifications and alterations to the composition of the above-described embodiment are also included within the scope of the present invention.

This application claims the benefit of Japanese Patent Application 2009-223583, filed Sep. 29, 2009, the entire disclosure of which is incorporated by reference herein.

EXPLANATION OF SYMBOLS 1 display device
2 touch panel
2a LCD
2b touch sensor
2c speaker
3 position detection unit
4 computation unit
5 control execution unit
10, 20, 30, 40 display information (pre-control)
10A, 20A, 30A, 40A display information (post-control)
PA position of first finger (pre-movement)
PC position of first finger (post-movement)
PB position of second finger (pre-movement)
PD position of second finger (post-movement)
33, 43 volume display bar (pre-control)
33A, 43A volume display bar (post-control)
51 CPU
52 RAM
53 ROM
54 ADC
55 I/F

The invention claimed is:

1. A display device, comprising:
a touch panel for displaying images;
a position detector that detects each respective XY coordinate of two simultaneously touched positions detected on the touch panel;
a calculator that when the XY coordinates of the two simultaneously touched positions have been detected twice in succession by one operation, computes differentials of X-direction distances and of Y-direction distances of the two simultaneously touched positions from a former coordinate detection to a latter coordinate detection; and
a control executor that controls a first control subject in accordance with the differential of the X-direction distances computed by the calculator, and controls a second control subject in accordance with the differential of the Y-direction distances computed by the calculator;
wherein the control executor controls the first control subject and the second control subject by one operation for detecting the two simultaneously touched positions twice in succession, and the control executor uses the differential of the X-direction distances in the one operation to control the first control subject and uses the differential of the Y-direction distances in the one operation to control the second control subject; and
wherein the first control subject is different from the second control subject.

2. The display device according to claim 1, wherein control executor determines a control amount of the first and the second control subjects in response to the magnitude of the differential.

3. The display device according to claim 1, further comprising a selector that select at least one out of the first and second control subjects from among multiple control subjects.

4. The display device according to claim 1, wherein one of the first and the second control subject is a size of image and another control subject is volume produced by the display device, respectively.

5. The display device according to claim 1, wherein the control executor increases or decreases a control amount of the first control subject proportional to a positive value or a negative value of the differential distance in a X-direction, respectively, and the control executor increases or decreases a control amount of the second control subject proportional to a positive value or a negative value of the differential distance in a Y-direction, respectively.

6. A control method comprising:
detecting XY coordinates of two simultaneously touched positions on a touch panel by one operation;
computing, when the XY coordinates of the two simultaneously touched positions are detected twice in succession within a predetermined time by one operation, differentials of X- direction distances and of Y-direction distances of the two simultaneously touched positions from a former coordinate detection to a latter coordinate detection; and
in a control executor, executing control of a first control subject in accordance with the computed differential of the X-direction distances and executing control of a second control subject in accordance with the computed differential of the Y-direction distances by one operation,
wherein one of the first and second control subjects is an image size and an other of the first and second control subjects is volume produced by the display device.

7. A non-transitory computer- readable recording medium on which is recorded a program that causes a computer in a display device equipped with a touch panel for display images to execute the steps of:
detecting XY coordinates of two touched simultaneously positions on a touch panel by one operation;
computing, when the XY coordinates of the two simultaneously touched positions are detected twice in succession within a predetermined time by one operation, differentials of the X-direction distances and the Y-direction distances of the two simultaneously touched positions from a former coordinate detection to a latter coordinate detection; and
in a control executor, executing control of a first control subject in accordance with the computed differential of the X-direction distances and executing control of a second control subject in accordance with the computed differential of the Y-direction distances by one operation,
wherein one of the first and second control subjects is an image size and an other of the first and second control subjects is volume produced by the display device.

8. The display device according to claim 2, further comprising a selector that select at least one out of the first and second control subjects from among multiple control subjects.

9. The display device according to claim 2, wherein the first and the second control subject are the size of image and the volume produced by the display device, respectively.

10. The display device according to claim 3, wherein the first and the second control subject are the size of image and the volume produced by the display device, respectively.

11. The display device according to claim 2, wherein the control executor increases or decreases the control amount of the first control subject proportional to a positive value or a negative value of the differential distance in an X-direction, respectively, and the control executor increases or decreases the control amount of the second control subject proportional to a positive value or a negative value of the differential distance in a Y-direction, respectively.

12. The display device according to claim 3, wherein the control executor increases or decreases a control amount of the first control subject proportional to a positive value or a negative value of the differential distance in a X-direction, respectively, and the control executor increases or decreases a control amount of the second control subject proportional to a positive value or a negative value of the differential distance in a Y-direction, respectively.

13. The display device according to claim 4, wherein the control executor increases or decreases a control amount of the first control subject proportional to a positive value or a negative value of the differential distance in a X-direction, respectively, and the control executor increases or decreases a control amount of the second control subject proportional to a positive value or a negative value of the differential distance in a Y-direction, respectively.

* * * * *